March 14, 1933.  G. E. PRENTICE  1,900,949
SLIDER FOR FASTENERS
Filed July 12, 1932   4 Sheets-Sheet 1

Inventor
George E. Prentice
by Roberts, Cushman & Woodbury,
Attys.

March 14, 1933. G. E. PRENTICE 1,900,949
SLIDER FOR FASTENERS
Filed July 12, 1932 4 Sheets-Sheet 2

Inventor
George E. Prentice
by Roberts, Cushman & Woodbury,
Attys.

Patented Mar. 14, 1933

1,900,949

UNITED STATES PATENT OFFICE

GEORGE E. PRENTICE, OF BERLIN, CONNECTICUT

SLIDER FOR FASTENERS

Application filed July 12, 1932. Serial No. 622,085.

This invention relates to slide operated separable fasteners of the kind in which complemental series of mating or interlocking fastener elements are arranged along the opposite edges of a gap or opening in a garment, shoe, receptacle, or other article, and relates more particularly to an improved slider for moving the fastener elements of the opposed series into and out of cooperating relationship; this application being a continuation in part of my copending application, Serial No. 562,518, filed September 12, 1931.

It has heretofore been proposed to make sliders of this character by casting, coining, milling, etc., but none of these modes of production has thus far been found commercially satisfactory, partly by reason of the initial cost of production and partly on account of the undue weight and clumsy appearance of the finished article. For these reasons sliders are almost universally made from sheet material, but this usually necessitates reinforcement by yoke pieces, soldering, or the like to provide the strength and rigidity requisite to prevent spreading of the front and rear wings of the slider during use, all of which adds to the expense of manufacture and often results in the formation of a slider of undesirable appearance, and when stiffening of the neck has previously been attempted, as by doubling or bending the sheet material at this point, a line of weakness, incipient crack, or actual crevice has invariably been produced, so that even though the neck might appear of adequate depth to resist separation of the wings during use, such inherent defects so reduce the effective section of the material at the neck as greatly to lessen the strength of the slider as compared with that which might be expected theoretically.

I have previously made rivetless sheet metal sliders stiffened by the provision of integral external ribs or yokes at the neck portion and am aware of other attempts to obtain the desired stiffness in a sheet metal slider as, for example, by sharply bending the metal at the neck to form a V-shaped fold constituting the divider, but none of the prior constructions known to me meets all of the requirements of an acceptable fastener for use under all of the severe conditions to which such sliders are subjected.

The fastener units of the earlier and cruder constructions were of substantially rectangular shape, having sharp outer corners, but the more modern fastener units have rounded outer edges which not only give a better and more finished appearance with less likelihood of scratching or otherwise injuring fine garments or the like with which they are associated, but which also conduces to the smooth and free movement of the slider. Prior sliders have usually been designed with channels and separator members of a shape particularly intended to cooperate with the rectangular type of fastener unit, and in designing them, a considerable proportion of the normal strength of the metal has been sacrificed in stretching it to shape and in the employment of sharp angles and corners rather than smoothly rounded, arch-like bends adapted to use the strength of the material employed to its greatest advantage. Moreover, in many prior constructions, the tab or pull-retaining member has been made as a separate piece of material, thus necessitating a multiplication of operations in assembling the slider. Furthermore, the means for attaching this pull-retaining member has not always been as strong as desirable, and in some cases has necessitated a sacrifice of strength in the slider body itself.

In accordance with the present invention I provide a novel slider which, in the preferred form, is made of a single piece of sheet material (with the exception of the pull tab), its neck being of tubular and preferably substantially oval contour at that transverse vertical cross section, at least which is midway between the wings, and with its longer dimension vertical so as to form a very rigid strut well adapted to resist relative movement of the slider wings, and which incidentally is particularly well adapted for use with fastener elements of the modern type having smoothly rounded outer ends with which it cooperates to give a smooth and easy opening and closing movement. While particularly useful with this type of fastener element, the improved slider, though perhaps to a lesser degree, adds to the smoothness of operation of the older type of fastener unit. At the same time the new slider is exceedingly rigid and stiff, utilizing the material to the best advantage for the purpose, avoiding sharp bends, doubling, or other weakening processes, and so disposing the metal that the finished slider is from 50 to 300% stronger than prior sliders of similar weight, and thus it is possible to make an acceptable slider of small size and light weight, and at an extremely low cost, and which in external appearance is more pleasing than the usual types of slider.

The neck portion of a slider of this character necessarily remains between the stringers when the fastener is closed, and as usually constructed, is of such shape that it tends to hold the stringers in widely divergent relation at the upper end of the slider so as to produce an objectionable gap beyond the end stops when the slider is in closing position. Moreover, while the inner surface of the neck of prior sliders is usually so shaped as to perform its fastener separating function, it is not ordinarily of such contour as to facilitate the smooth and ready entry of the opposed series of fastener elements into the respective guide channels, so that in closing the fastener unnecessary friction is engendered and the closing operation is unduly harsh.

In accordance with the present invention I provide a slider whose neck portion preferably tapers upwardly substantially to an acute edge, as well as downwardly, so that the mouths of the guide channels substantially merge at the extreme upper end of the slider, thus permitting the opposed stringers to lie close together in substantially parallel relation beyond the end of the slider when the fastener is closed, and at the same time providing smoothly tapering throats for guiding the fastener elements into their respective channels.

Sliders of the kind in question are commonly made of a material which is resistant to corrosion from the effects of moisture, perspiration, etc., one such material, for example, being an alloy comprising approximately 64% copper, 18% nickel, and 18% zinc, such material being known under the trade name of "18% nickel alloy" or sometimes as "nickel silver". The tensile strength of this material in sheet form and in the annealed condition is in the neighborhood of 58,000 pounds per square inch, with a hardness approximately 77 Brinell. The hardness and strength of such material is greatly increased by cold working it mechanically as by folding, forging, swedging, etc. By such mechanical working the strength may rise as high as 95,000 pounds per square inch and the hardness may increase to 158 Brinell. However, it is very important to note that harsh working may result in extreme brittleness and the formation of incipient fractures.

In accordance with the preferred method of making my improved slider I employ sheet material of substantially the composition above referred to (although it is to be understood that other materials may be employed) and throughout the several steps of the process seek to increase the strength of the metal by mechanical working while at the same time observing the greatest care to avoid harsh treatment such for example, as sharp bending which tends to develop lines or areas of undue hardness and brittleness or the formation of incipient cracks or fractures, and I attribute the great strength of my improved slider, as compared with prior constructions, not only to its improved structural shape, as above referred to, but in part at least to the method of conforming the original flat sheet metal blank to the shape of the completed slider body.

In thus conforming and molding the sheet metal to shape, I take care always to confine all parts closely between enveloping walls while changing the shape of such parts, and to produce the ultimate shape in a series of successive folding or buckling operations, while avoiding any such stretching of the metal as to thin it, or the formation of sharp angles or bends at any time in the process. The metal is thus constrained to flow smoothly without disruption of its fibrous structure, but during such flow its constituent crystals so rearrange themselves as greatly to increase the strength and hardness of the material, particularly at the neck portion of the slider where the working of the metal is most pronounced.

The improved apparatus employed in carrying out my process comprises suitable dies and adjunctive elements adapted to confine the material at substantially all points during the shaping operations, whereby at all parts to determine the flow of the metal accurately, thus avoiding the accidental production of excessive strains at any point and compelling the material to flow smoothly so that incipient cracks or fractures are avoided.

In the accompanying drawings in which certain desirable embodiments of the invention (including a desirable form of slider, and preferred steps in and apparatus appropriate to its manufacture) have been illustrated by way of example.

Fig. 3ª is a section, to larger scale, on line 3ª—3ª of Fig. 3;

Fig. 5 is a corresponding front elevation;

Fig. 7 is a corresponding front elevation;

Fig. 30 is a plan view of a forming die for use in changing the shape of the blank from that of Fig. 5 to that of Figs. 6 and 7;

Fig. 31 is a section on the line 31—31 of Fig. 30 showing the punch, which cooperates with the die of Fig. 30, substantially at the end of its down stroke and showing the slider in vertical section;

Fig. 31ª is a fragmentary elevation of the lower end portion of the punch shown in Fig. 31;

Fig. 31ᵇ is a section on line 31ᵇ—31ᵇ of Fig. 31ª;

Fig. 32 is a section on line 32—32 of Fig. 30 showing the slider in position in the die and in vertical section.

Fig. 33 is a vertical section illustrating the cooperating die and punch which converts the embryo slider body from the shape of Fig. 5 to that of Fig. 7;

Fig. 33ª is a top view of one of the arbors of the punch shown in Fig. 33;

Fig. 34 is a vertical section illustrating a punch and die operative to give the final shape to the neck of the slider whereby to change it from a form substantially as shown in Fig. 10 to that of Fig. 14;

Fig. 34ª is a side elevation of one of the arbors of the die, of Fig. 34;

Fig. 35 is a section substantially at right angles to that of Fig. 34; and

Figures 1, 17:
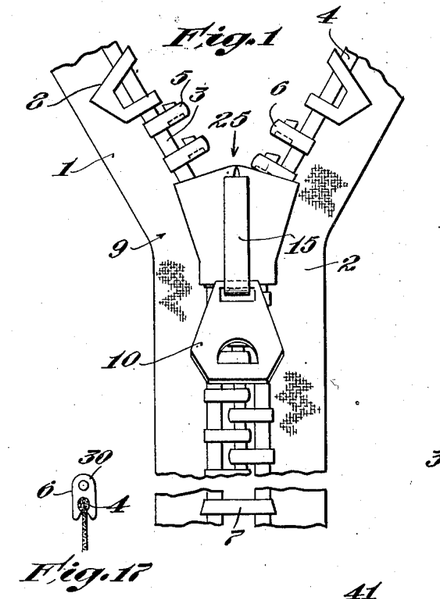
Fig. 1 is a fragmentary front elevation of a separable fastener of the class to which the present invention relates, showing the improved slider associated therewith.
Fig. 17 is a plan view of a single fastener element showing the edge of the stringer in section.

Referring to the drawings, and particularly to Fig. 1, the numerals 1 and 2 indicate respectively the flexible stringer members usually employed in fastener devices of this character to support the opposed series of fastener elements. These stringers are provided, as is usual, with beaded edges 3 and 4 respectively, to which are secured the fastener units forming the opposed series 5 and 6 respectively. The stringers are united at one end of the gap by means of a stop 7, and at the other end of the series of fastener units, stops 8 are provided for limiting the movement of the actuating slider 9. This slider, as here disclosed, is furnished with an elongate pull retaining loop 15 which passes through an opening in the pull tab 10 and which, as here shown, is elongate to permit the pull tab to be moved from the top to the bottom of the slider to facilitate movement of the slider in either direction.

For convenience in further description, the upper end of the slider, as viewed in Fig. 1, is referred so as the top of the slider, and the other end is referred to as the lower or bottom end, it being understood that such reference is for ease in description, and that in actual use the slider may move horizontally as well as up and down, and that the wider end of the slider may, under some conditions, be its lower end.

Figure 2:
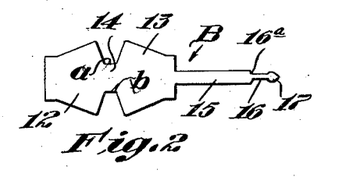
Fig. 2 is a plan view to smaller scale of a blank useful in making the improved slider.

The improved slider herein disclosed is preferably made from sheet material, such as sheet metal, which offers substantial advantages, for example lightness of weight, ease of working, and capability of taking a fine finish, in the manufacture of sliders of this type. Thus, in accordance with the preferred method of manufacture, I make the slider body from a unitary blank B (Fig. 2) of sheet material which may be stamped or otherwise shaped from the sheet to provide the rear wing 12, the front wing 13 and the integral and relatively narrow neck portion 14. In the preferred construction the free end of the wing 13 is provided with an elongate integral extension or tongue 15 the central portion of which forms the pull retaining loop above described. Near its end this tongue is reduced in width forming a shoulder 16a and the narrow portion 16, the latter terminating in the enlargement or head 17. As indicated in Fig. 2, the lateral edges a—b of the neck portion 14 of the blank are substantially parallel and the opposite ends of these edges a and b merge directly with the wider ends of the wings 12 and 13. The neck portion of the blank is thus bounded by the edges a and b and the wings 12 and 13 and is devoid of any projecting flaps, tabs or the like extending outwardly beyond the edges a and b.

Figure 3:
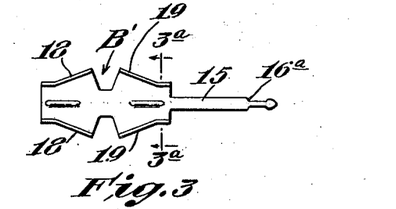
Fig. 3 is a plan view similar to Fig. 2, but showing the blank at the end of one of the early steps in the process of making the slider.
Figure 3A:
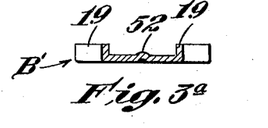
Figures 4, 6, 8, 9, 10, 11, 12, 13, 36, 37:
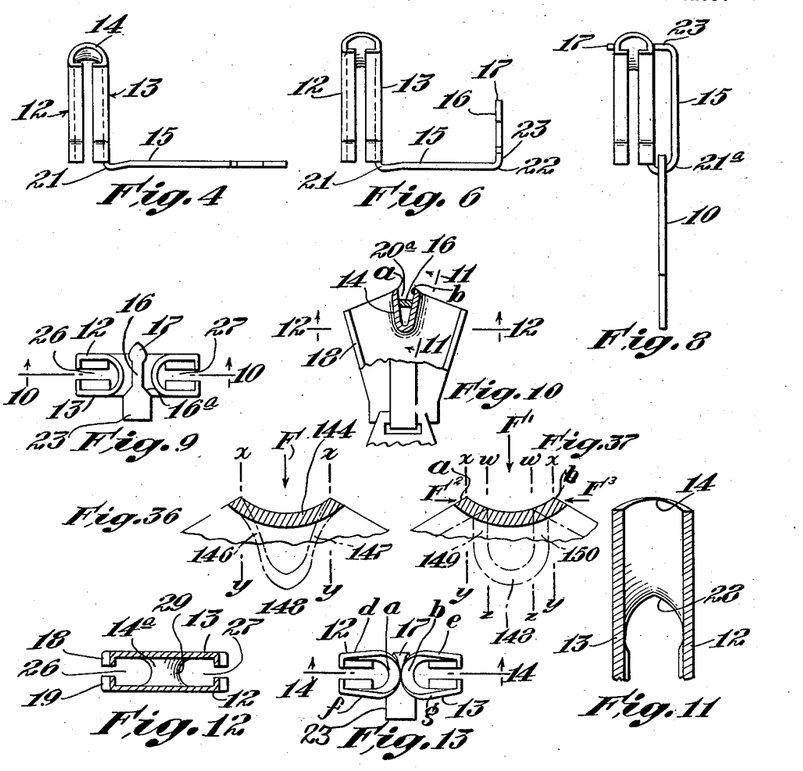
Fig. 4 is an edge view of the blank at the end of a further step in the process.
Fig. 6 is an edge elevation of the blank at the end of a further step in the process.
Fig. 8 is an edge view of the slider just prior to the last step in the process.
Fig. 9 is a plan view of the parts as shown in Fig. 8.
Fig. 10 is a fragmentary section substantially on the line 10—10 of Fig. 9.
Fig. 11 is a fragmentary section to larger scale substantially on the line 11—11 of Fig. 10.
Fig. 12 is a section on the line 12—12 of Fig. 10.
Fig. 13 is a plan view of the completed slider, omitting the pull tab.
Figs. 36 and 37 are diagrams illustrating the action which I believe to be produced by indenting the neck of the slider in accordance with two different methods of procedure, respectively.
Figures 5, 7, 30, 31, 31A, 31B, 32, 33, 33A, 34, 34A, 35:
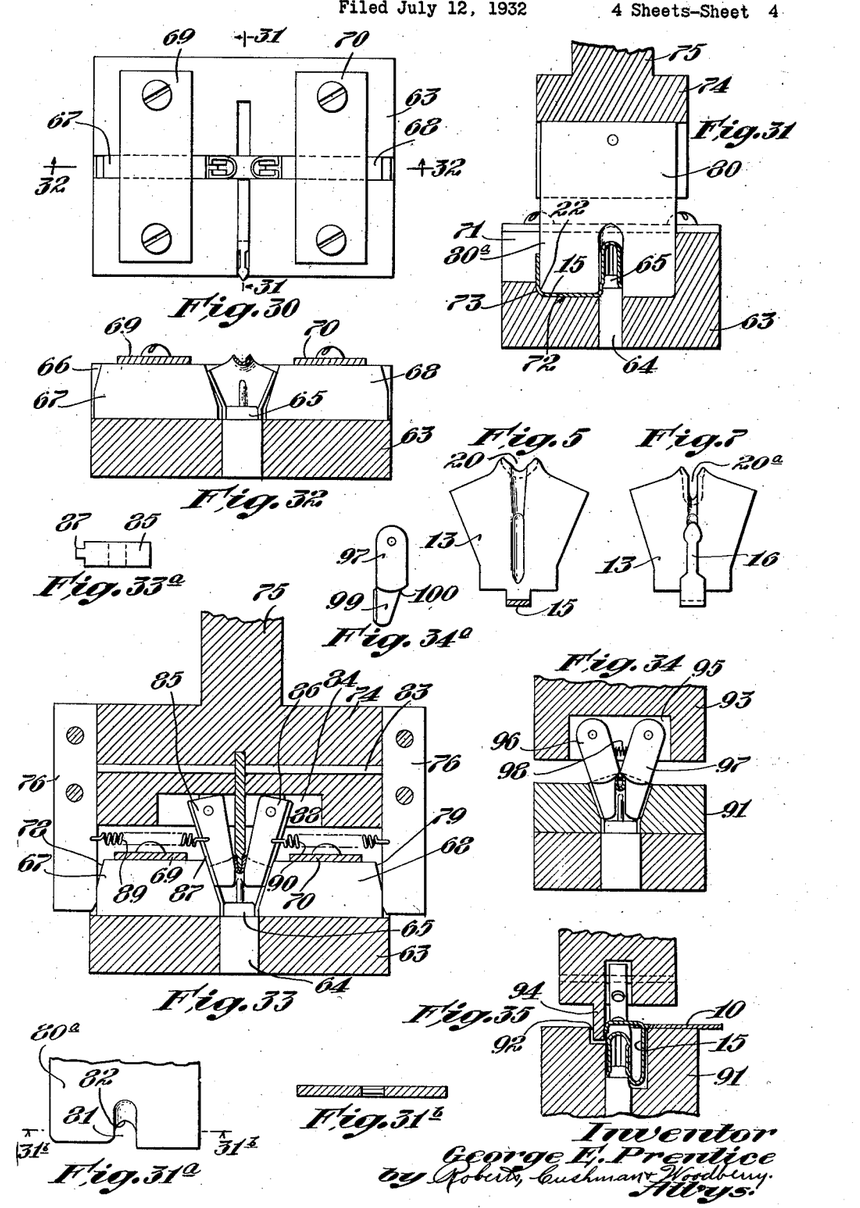

Having provided the blank B above described, the next step in the process is to turn up the flanges 18 and 19 at the lateral margins of the rear and front wings respectively, as shown in Fig. 3, and then to fold the blank at its neck portion so as to bring the wings into substantially parallel relation, with the flanges 18 and 19 of the rear and front wings opposed to each other. Either after or concomitantly with this first folding operation the neck portion is pressed, swedged or otherwise depressed at its central portion to form a hollow, as shown at 20 in Fig. 5, the side walls of this hollow preferably making an angle of approximately 23° with each other. Thereafter, the depression of the neck portion is carried further, as shown in Figs. 6 and 7, as for example by placing a suitable arbor between the wings and by employing a punch of proper shape working in unison with side pressers so as gradually to deepen the hollow in the neck as the metal is folded or buckled until it takes the U shape shown at 20a in Figs. 7 and 10, the angle between the side walls of the deep fold constituting the neck being now approximately 18°, while the bend or bottom of the fold which constitutes the neck is disposed between the wings and at a point substantially below the extreme upper end of the slider. Either subsequent to or concomitantly with these neck shaping operations, the extension strip is first bent outwardly at 21, as shown in Fig. 4, and then upwardly at 22 to form the arm 23. The pull tab is then threaded over the arm 23 and onto the part 15, and the extension is then again bent, as shown at 21a in Fig. 8, so that the arm 23 is caused to lie in the deepened hollow or socket opening provided in the upper surface of the neck. This socket opening extends from front to rear and is thus adapted to receive the narrow portion 16 of the pull retaining member with the shoulder 16a engaging the front surface of the front wing, and the head 17 is preferably bent down to engage the rear surface of the rear wing. Having disposed the part 16 within its socket, the neck shaping operation is then completed by swedging the lateral marginal portions of the neck, as shown at 24 in Fig. 14, so as smoothly to curve the material and to cause the opposite lateral margins of the neck substantially to meet and form an acute angle at the point 25 which thus defines the extreme upper end of the slider, the opposite lateral portions of the neck being curved concavely toward each other so that the neck becomes in effect of substantially oval tubular form in the vertical transverse section illustrated in Fig. 14.

Figure 14:
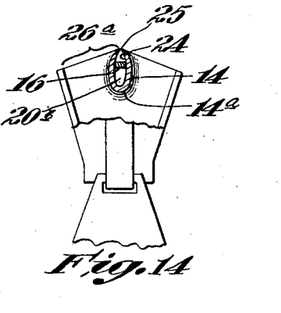
Fig. 14 is a fragmentary section on the line 14—14 of Fig. 13.

It may be noted that the flanges 18 and 19, together with the front and rear wings and the neck 14, define the guide channels 26 and 27 for the opposed series of fastener elements, and that the neck constitutes a divider for separating the opposed series of fastener units as the slider is manipulated for opening the fastener. Due to the shaping of the neck, as above described, whereby its outer or fastener engaging surface is arched in planes substantially at right angles to each other, to wit, in a plane substantially parallel to the planes of the wings, and a vertical plane perpendicular thereto, its extreme lower end 14a, which first engages the slider units in the separating operation, is upwardly arched in a plane extending from front to rear of the slider, as shown at 28 in Fig. 11, forming a smoothly curved surface which is uninterrupted and integrally continuous in a front to rear direction and which merges into the inner surfaces of the wings 12 and 13 respectively. Moreover, the material whch constitutes the neck is arched downwardly in a plane parallel to the wings as shown in Fig. 10 and is continuously curved, smooth, and uninterrupted from one lateral margin of the neck to the other lateral margin thereof, and throughout its entire thickness is devoid of sharp angles, crevices, lines of weakness, or incipient cracks, such as are commonly formed by doubling material upon itself. It may also be noted from inspection of Fig. 12 that (in horizontal section) the lateral surfaces of the neck are substantially U-shaped and convexly curved toward each other, as shown at 29, and that these lateral surfaces also merge smoothly into the inner surfaces of the front and rear wings, the edges of the lateral margins of the neck material merging smoothly into the upper edges of the front and rear wings as shown in Fig. 9. By reason of the swedging of the upper margins of the neck, as above described, the lateral surfaces of the neck are concave toward each other in a plane parallel to the wings and thus the entrance mouth 26ª of each guide channel flares in width, being widest at its extreme upper end, and since the margins of the neck approach each other at an acute angle and substantially meet at the point 25, these entrance mouths or throats of the guide channels substantially merge at the latter point. Thus, as shown in Fig. 14, the neck member tapers from an intermediate point of maximum lateral width both downwardly and upwardly, the end of the pull retaining member being received in the socket 20ᵇ at the widest part of the neck portion. Not only does the arching of the neck portion in planes transverse and longitudinally of the slider tend to produce a maximum stiffness and rigidity in the sheet metal slider, but the upward acute taper of this member assists in eliminating the objectionable gap commonly found in fasteners of this type when the slider is in the closing position.

Figures 18, 19, 20:
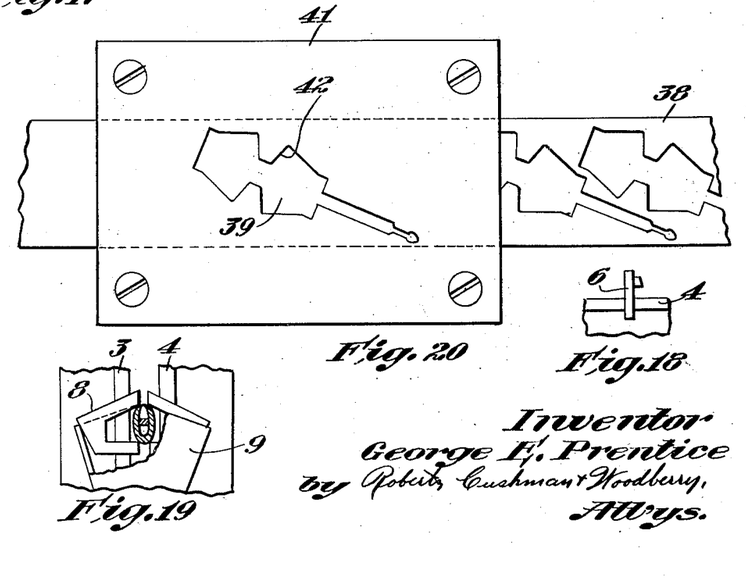
Fig. 18 is a side elevation of the parts shown in Fig. 17.
Fig. 19 is a front elevation, partly broken away and partly in section, showing the cooperative relation of the neck of the improved slider with a desirable form of end stop and with the edges of the stringers of the fastener device.
Fig. 20 is a plan view of a blanking die useful in forming blanks such as shown in Fig. 2 from a strip of sheet material.

As indicated in Fig. 19, wherein I have illustrated end stops of a preferred construction, the edges of the stringers 3 and 4 are not forced outwardly and away from each other by the interposed neck member, but above the widest part of this neck member the stringers normally lie in substantially parallel relation and may readily be brought into contact so that little, if any, gap will be left at the upper end of the slider. Moreover, by reason of the flaring mouths provided for the guide channels, the fastener units are enabled to enter the guide channels with a much smoother action than is usually possible, while the curved or U-shaped inner surfaces of the guide channels are adapted particularly to cooperate with fastener units, such as shown in Figs. 17 and 18, having smoothly rounded end portions 30. Such rounded end portions contact with the inner surface of the neck throughout a substantial area so that the wear is distributed and the movement of the unit relatively to the neck is smoother and less harsh than when the end of the fastener unit strikes a flat surface with which it has only a line contact.

I herein refer to the neck of the slider as "tubular" for convenience in description, but with the understanding that the marginal portions of the neck material need not in all cases come into actual contact so as to form a complete tube, since substantially the same strut-like effect is obtained if the margins of the neck material do not actually abut. Furthermore, while the marginal portions of the neck material are preferably closely adjacent to each other, if not in actual contact, at those portions which are substantially midway between the wings, so as at this part at least of the neck to form a tubular structure as above defined, such marginal portions of the neck material diverge from each other adjacent to the front and rear wings respectively so that where the neck material merges into the wings, the neck does not in fact form a complete tube.

Thus in vertical section the neck is of substantially minimum dimensions at a plane midway between the wings, gradually increasing in dimension as it approaches and eventually merges into the front and rear wings, respectively, so that in horizontal section or in plan (Fig. 12) the neck has a more or less hyperbolic contour or in, everyday language, a contour like that of a conventional grain sheaf.

In carrying out the several steps of the process of manufacture as above referred to, I prefer to employ apparatus such as herein illustrated. This apparatus is well adapted to perform the several successive operations and in particular to keep the material under proper confinement as the material is caused to buckle and flow so as to avoid the formation of sharp angles, bends, cracks, or lines of weakness.

Figure 21:
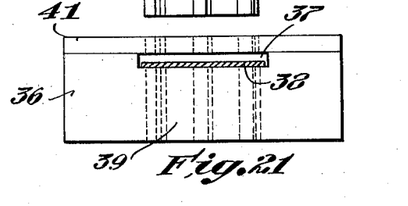
Fig. 21 is an end elevation of the parts shown in Fig. 20, the strip of material being shown in section.
Figure 22:
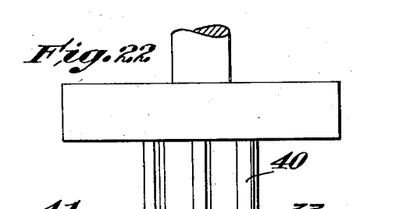
Fig. 22 is an end elevation of a blanking punch cooperating with the die of Fig. 20.

For performing the first step I prefer to use apparatus such as illustrated in Figs. 20, 21 and 22. This apparatus comprises a die block 36 having a guide slot 37 of appropriate width to receive a strip 38 of the sheet material from which the slider blanks are to be formed. The die block has an orifice or cavity 39 contoured to correspond to the outline of the desired blank B and with which the punch 40 cooperates to punch out the blank from the sheet. Preferably the die block is furnished with a fixed stripper plate 41 having an opening 42 through which the punch descends, the plate preventing the sheet material from following the punch as the latter rises. The strip material may be fed through the slot 37 in any appropriate manner, for example, by hand, while the punch is reciprocated to cut out one blank after another from the strip.

Figure 23:
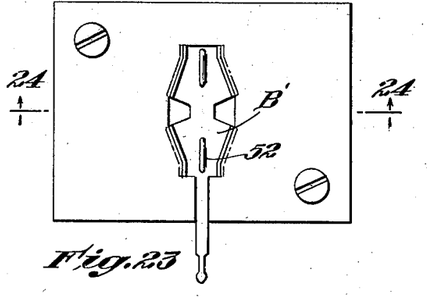
Fig. 23 is a plan view of a die used in reducing the blank of Fig. 2 to the form shown in Fig. 3.
Figure 24:
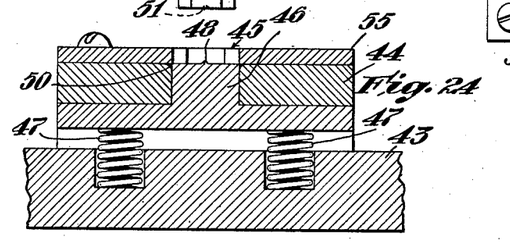
Fig. 24 is a section, to larger scale, on the line 24—24 of Fig. 23.
Figure 25:
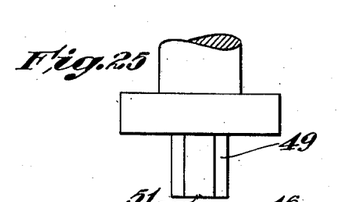
Fig. 25 is a side elevation of the punch which cooperates with the die of Figs. 23 and 24.

For performing the next step in the process, apparatus such as shown in Figs. 23, 24 and 25 is preferably employed. This apparatus comprises a die bed 43 carrying the fixed die 44 having the orifice or cavity 45 contoured to correspond to the flanged blank B' as shown in Fig. 3, the upper surface of the die bed having a slot for the reception of the tongue member 15 of the blank. Within the orifice or cavity 45 is arranged a die pad 46 supported upon springs 47 and preferably having upstanding ribs 48. A punch 49 cooperates with the die to turn up the lateral flanges 18 and 19 on the front and rear wings of the blank, the edges of the die cavity being rounded as shown at 50 so as to obtain the desired bending of the material of the blank without cutting the latter. The lower face of the punch 49 is furnished with slots 51 complemental to the ribs 48 on the die pad and adapted to strike up stiffening bosses 52 in the material of the front and rear wings of the blank, it being understood that if such stiffening bosses are not desired, the ribs 48 and slots 51 may be dispensed with.

Figure 26:
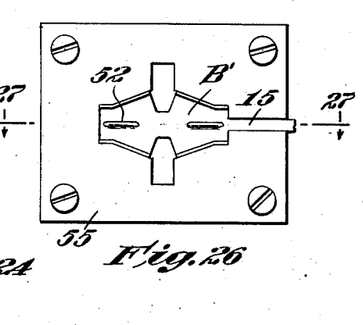
Fig. 26 is a plan view of a forming die employed in converting the blank from the shape shown in Fig. 3 to that shown in Figs. 4 and 5.
Figure 27:
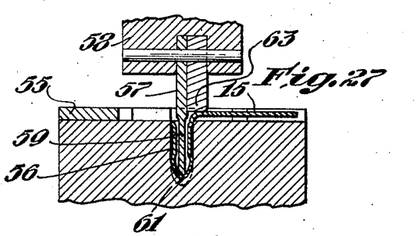
Fig. 27 is a section on line 27—27 of Fig. 26 showing the forming die and its cooperating punch just at the end of the down stroke of the punch and showing the resulting embryo slider in section.
Figure 28:
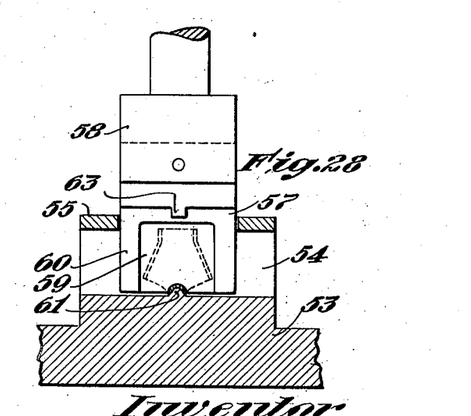
Fig. 28 is a section substantially at right angles to Fig. 27.
Figure 29:
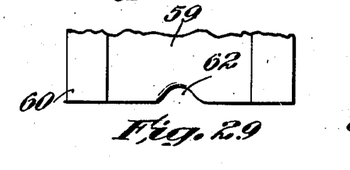
Fig. 29 is a fragmentary enlarged elevation of the lower end portion of the forming punch of Fig. 28.

In carrying out the next step in the forming operation I prefer to employ devices such as illustrated in Figs. 26, 27 and 28. These devices comprise a die bed 53 carrying the die 54 provided with the gauge 55 having an opening adapted to receive and properly to position the flanged blank B'. The die has a cavity 56 of a width substantially equalling the front to rear thickness of the completed slider body. A punch 57, mounted in a holder 58, cooperates with the die 54. The punch 57 has a central portion 59 of a thickness substantially equalling the distance between the inner edges of the side flanges of the completed slider body, and also has lateral thicker portions 60 to give it sufficient strength. The bottom of the cavity 56 in the die is furnished with a smoothly curved rib 61 and the lower edge of the punch is provided with a recess 62 (Fig. 29) curved correspondingly to the curvature of the rib 61. The punch holder is also provided with a member 63 adapted to engage the tongue 15 of the blank and to turn the latter downwardly substantially at right angles to the front face of the front wing as indicated at 21, Fig. 4. The gauge 55 has a slot adapted to receive the turned down tongue 15.

The slider blank B', Fig. 3, is placed in the opening in the gauge plate 55 and the punch is moved downwardly thereby bringing the front and rear wings into substantially parallel relation and bending the tongue at right angles as just referred to. During the last part of the downward movement of the punch, the curved recess 62 cooperates with the rib 61 to indent the neck of the slider transversely as shown at 20, Fig. 5.

The next step in the process is carried out by the use of the apparatus shown in Figs. 30 to 33, inclusive. This apparatus comprises the die bed 63 provided with the central part 64 carrying the upwardly extending fixed arbor 65 shaped to fit accurately but freely within the narrow or lower part of the embryo slider body of Figs. 4 and 5. The die bed also has a transverse slot 66 forming a guide for a pair of oppositely moving slider jaws 67 and 68 whose inner ends are shaped substantially to the exact contour of the lateral edges respectively of the completed slider body. A pair of cap plates 69 and 70 secured to the die bed 63 retain the slider jaws 67 and 68 in operative position within their guide slots.

The die bed is also furnished with a transverse recess 71 adapted to receive the tongue 15 which projects outwardly substantially at right angles to the front wing as a result of the previous operation. The recess 71 has a bottom surface 72 provided with an upstanding shoulder at 73 (Fig. 31).

A die punch 74 cooperates with the die bed in forming the slider body, the punch being carried by a shank 75 which may be secured in the reciprocating head of a suitable die press. Cam bars 76 are secured to the opposite sides of the punch 74. These cam bars move down into the opposite ends of the slot 66 as the punch descends and engage inclined surfaces 78 and 79 respectively on the outer ends of the slider jaws 67 and 68, thus simultaneously forcing the jaws toward each other.

The punch also has a downwardly projecting arbor 80 having a vertical slot 81 (Fig. 31ª) whose side walls are spaced apart a distance equalling the front to rear thickness of the completed slider body and whose upper end is curved or arched at 82 substantially corresponding to the transverse arch of the slider neck as indicated at 28 in Fig. 11, the arbor being secured to the punch by means of a pin 83. The slot 81 divides the lower part of the arbor 80 into spaced prongs, the prong 80ª which is at the left side of the recess as viewed in Fig. 31, being slightly shorter than the other prong. The lower edge of the shorter prong 80ª is substantially straight and horizontal but has rounded corners and is adapted to cooperate with the surface 72 and shoulder 73 of the die block in bending the free end of the tongue 15 at the point 22.

The under side of the punch 74 is furnished with a slot 84 (Fig. 33) which receives the upper ends of a pair of swinging arbors 85 and 86 which are pivotally secured to the punch 74. The lower portions of these arbors are of substantially the size and shape of the opposite guide channels of the completed slider body and these arbors are furnished with outstanding fins 87 and 88, respectively adapted to extend between the opposed flanges 18 and 19 of the slider body so as to maintain a proper spacing of the flanges during the shaping operation. Springs 89 and 90 tend to swing the lower portions of the arbors 85 and 86 away from each other, but such movement is limited by abutment surfaces at the upper ends of the arbors.

In using the apparatus of Figs. 30 to 33 the punch 74 is first lifted and the embryo slider of the shape shown in Figs. 4 and 5 is disposed in the die with its lateral edges engaging the inner surfaces of the jaws 67 and 68 and with the tongue 15 resting in the slot 71, while the arbor 65 projects up into the lower part of the slider body and substantially fills the latter. The punch is now moved downwardly, projecting the lower ends of the arbors 85 and 86 into the opposite channels respectively of the slider body, the fins 87 projecting between the edges of the flanges 18 and 19. The shorter prong 80$^a$ of the arbor 80 engages the tongue 15 and bends it at 22 while the arched surface 82 of the arbor 80 engages the neck of the slider part. As the arbor moves downwardly the cam members 76 force the jaws 67 and 68 inwardly thereby buckling the slider body and making its upper part narrower transversely, while at the same time the surface 82 of the arbor presses down upon the neck of the slider so as to deepen the recess 20 previously formed therein, the result of the several concomitantly acting forces being to narrow the slider laterally at its upper part at least and to decrease its height as shown in Fig. 7, as compared with Fig. 5, but without stretching the metal so as to thin it.

After this buckling operation has been completed by the apparatus just described, the pull tab 10 is threaded over the tongue 15 and the latter is bent as shown at 21$^a$, Fig. 8, thereby disposing the narrow portion 16 of the tongue in the deepened hollow or socket 20$^a$ in the neck. The slider is now completed, preferably by the use of apparatus such, for example, as shown in Figs. 34 and 35. This apparatus comprises a die block 91 having a cavity shaped to receive the slider body and the pull retaining loop formed from the tongue 15, the pull tab 10 resting upon the upper surface of the die block while the extreme end 17 of the tongue projects into a recess 92 of the die block.

A reciprocating punch 93 cooperates with the die block and carries a bending arbor 94 (Fig. 35) adapted to engage the end 17 of the tongue and to bend its end down against the rear wing as shown in Figs. 13 and 35. The punch also has a slot 95 in its under surface within which the upper ends of a pair of swinging arbors 96 and 97 are pivotally supported, a spring 98 tending to swing the arbors away from each other when the punch is raised. Each of the arbors 96 and 97 has a lower end portion 99 adapted to enter one of the slider channels, the inner edge of each arbor having a cam surface 100 (Fig. 34$^a$) adapted to swedge the extreme lateral edge portion of the neck material inwardly and over the part 16 thereby to lock the part 17 in fixed position. By this means the extreme lateral edges $a$ and $b$ of the neck material are brought into substantial contact at 25 (Fig. 14), the inner edges of the arbors 96 and 97 being smoothly curved and adapted to impart the desired concave curvature to the neck at the entrance to the slider channel.

It is to be noted that the neck of the completed slider is formed wholly from that portion of the blank which is bounded by the edges $a$, $b$ (Fig. 2) and the upper parts of the respective wings so that, as already noted, the margins of the neck, which contact at 25 in the completed slider, merge smoothly and integrally with the upper edges $d$, $e$, $f$, $g$ of the wings (Fig. 13), which would not be so if the neck included free projecting ears or flaps extending laterally beyond the lines $a$ and $b$ of the blank.

During the operation of forming the slider body as above described the material is supported and confined substantially at all points so that the material is constrained to flow in the desired direction and to the exact desired extent, the arrangement of parts being such that the material at the neck flows smoothly without fracture or abnormal disturbance of its fibrous structure thereby producing an arched tubular neck or strut merging smoothly into the substance of the wings. The result is that the slider strongly resists forces tending to separate the free ends of the wings, so that the slider body thus constructed has a strength, as determined by test, very much greater than that of previous constructions, even when the latter are made from material from 25 to 35 per cent thicker.

It is to be noted that the dimensions of the punches and dies and associated parts which are employed are such that when the slider is confined between the operating parts during the buckling operations it is not pinched, so as to be thinned down at any point, as is the case with most previous types of bending and forming dies used for similar purposes. Thus, when the slider body of Fig. 4 is placed in the die shown in Fig. 33 it fits snugly but freely therein. The bottom arbor 65 which is of the exact size in horizontal section of the interengaging fastener units with which the slider is intended to cooperate, fits closely but freely in the lower end of the slider body; the arbors 85 and 86 closely fit but do not bind in the channels of the slider; while the two prongs of the arbor 80 engage the outer surfaces of the respective wings with a free sliding fit so as to support the wings against spreading as the surface 82 of the arbor forces the neck material downwardly.

In Figs. 36 and 37 I have illustrated by diagrams my present theory as to what takes place when the metal of the neck is indented solely by downward pressure, as has heretofore been proposed, as contrasted with the action when the downwardly applied force is assisted by inwardly directed lateral forces.

Thus, in Fig. 36, assuming that the part 144 is the neck portion of an embryo slider such as shown in Fig. 5, and that the lines $xy$—$xy$ represent the vertical planes of the lateral edges of the neck material,—if the downward force F be applied to the central part of the neck 144 so as to indent the neck material downwardly, as indicated at 145 without changing the relative positions of the planes $xy$—$xy$, the material of the neck must necessarily stretch and become substantially thinner,—tending to stretch non-uniformly, becoming thinnest at points 146 and 147 intermediate the upper and lower parts of the neck material. It may be noted that the parts of minimum thickness occur at substantially that portion of the neck where maximum stress is encountered in resisting separation of the wings during use.

On the other hand, if, as illustrated in Fig. 37,—while the downward force F' is applied for indenting the neck material, other forces $F^2$ and $F^3$, respectively, are caused concomitantly to act so as to move the lateral margins of the neck from the planes $xy$ to the planes $wz$, the material of the neck may be folded to the shape shown at 148 without necessitating substantial stretch or appreciable thinning of the side walls 149 and 150, it being noted in this connection that in proceeding in this way, the force F' may be of less intensity than the force F acting alone. Apparently the inward movement of the sides of the neck serves in a sense to feed in material in such a way as to avoid depletion and thinning of the downwardly flowing metal and so that the neck material is not substantially stretched or elongated along its central or neutral plane during the folding operation. Thus, while the lateral width of the wings is decreased during the operation and the edges of the neck portion of the blank are moved toward each other (from the planes $x$—$y$ to the planes $w$—$z$), the total length of the neck material, measured along its neutral or median plane, remains substantially unchanged. Since the material is of small thickness, the peripheral distance around the completed tubular neck, measured from margin to margin thereof, substantially equals the width of the neck material between the planes $x$—$y$ or, in other words, between the parallel edges $a$—$b$ of the neck material of the original blank. Thus the walls of the completed fold, (below their extreme upper edges) are of substantially the same thickness as that of the original blank, and are uniformly thick in transverse section and devoid of weakened areas,—the distributed stresses employed in the process being well adapted to harden the metal by cold working without producing incipient cracks or fractures, so that the neck is very strong and stiff, and well able to resist stresses applied thereto.

Figure 15:
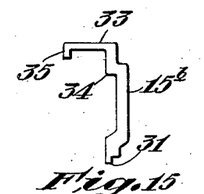
Fig. 15 is a side elevation of a pull retaining element of modified construction.
Figure 16:
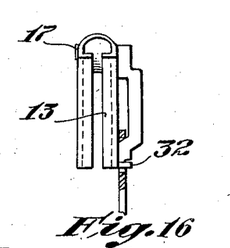
Fig. 16 is a side elevation of a slider employing the pull retaining element of Fig. 15.

In Figs. 15 and 16 a modified construction of pull retaining element is shown, such pull retaining element consisting of a separate and independent member comprising the elongate portion $15^b$ adapted to receive the pull tab and a toe portion 31 at its lower end which is adapted to enter an opening in a lug 32 projecting forwardly from the lower end of the front wing 13 of the slider body. The upper end of the member $15^b$ is furnished with an arm 33 having a shoulder at 34 adapted to engage the front wing and a downturned portion 35 at its rear end adapted to overlap the rear wing, it being understood that the part 33 is disposed in the socket in the neck of the slider body in the same way as the part 16 above described, and that the marginal portions of the neck will be swedged over said part 33 whereby to anchor the pull retaining member in position.

When herein I have employed the terms "vertical" and "horizontal" for convenience in description, I use them with reference to a slider disposed with its neck uppermost as illustrated, for example, in Fig. 1, but do not intend these terms to be limiting expressions or to indicate that the slider is always to be used in the position of Fig. 1. Moreover, when I refer to the "lateral" margins of the neck I intend to indicate the right and left-hand edge portions of the neck as shown, for example, in Fig. 14, such portions being formed from the free margins of the neck portion 14 of the blank shown in Fig. 2. Moreover, when I refer to a transverse section or plane, I intend thereby to indicate a section or plane substantially parallel to the planes of the front and rear wings.

While I have herein illustrated certain desirable embodiments of the invention by way of example, I wish it to be understood that the invention is not necessarily limited thereto, but that modifications thereof, variations in material and dimensions, and the substitution of all equivalents may be made without departing from the spirit of the invention.

I claim:

1. An actuating slider for use with separable fasteners of the class described, said slider having converging guide channels and consisting of sheet material, the slider comprising front and rear wings and a neck integrally connecting the wings, said neck being arched in planes at right angles to each other whereby to provide a stiff rigid strut between the wings, the fastener engaging surface of the neck being of curved contour and continuously smooth and uninterrupted from one margin of the neck to the other margin thereof, said surface merging smoothly into the inner surfaces of the front and rear wings respectively.

2. An actuating slider for use with separable fasteners of the class described, said slider having converging guide channels and consisting of sheet material, the slider comprising front and rear wings and a neck integrally connecting the wings, said neck being arched in planes at right angles to each other whereby to form a rigid strut for holding the wings in fixed spaced relation, the fastener engaging surface of the neck being of curved contour and continuously smooth and uninterrupted from one margin of the neck to the other margin thereof.

3. An actuating slider for use with separable fasteners of the class described, said slider having converging guide channels and consisting of sheet material, the slider comprising front and rear wings and a neck integrally connecting the wings, said neck constituting a divider for the opposing series of fastener elements and having concave outer surfaces merging smoothly into the inner surfaces of the wings whereby, with the wings, to define channels of substantially U-shaped horizontal transverse section, the outer surface of the neck being continuously curved, smooth, and uninterrupted from one margin of the neck to the other margin thereof.

4. A slider of the class described, comprising front and rear wings and parts cooperating therewith to define guide channels for opposed series of fastener elements, one of said parts dividing the channels one from the other, said latter part being so thin, transversely, at its upper end that the upper ends of the channels substantially merge at the extreme upper end of the slider.

5. A slider of the class described comprising front and rear wings and parts cooperating therewith to define guide channels for opposed series of fastener elements, said channels converging into a single channel at the lower part of the slider, one of said parts dividing the channels one from the other, said latter part tapering upwardly to provide flaring entrance mouths for the channels and being so thin transversely at its upper end that said mouths substantially merge at the extreme upper end of the slider.

6. An actuating slider for use with separable fasteners of the class described, said slider having converging guide channels and consisting of sheet material, the slider comprising front and rear wings and a neck integrally connecting the wings, said neck tapering upwardly in width substantially to an acute angle so that the mouths of the guide channels substantially merge at the extreme upper end of the slider.

7. An actuating slider for use with separable fasteners of the class described, said slider having converging guide channels and consisting of sheet material, the slider comprising front and rear wings and a neck integrally connecting the wings, said neck tapering upwardly and downwardly from a point located between the wings, the upward taper poviding an acute angle at the upper end of the neck, and a pull-retaining element secured to the widest portion of the neck.

8. An actuating slider for use with separable fasteners of the class described, said slider having converging guide channels and consisting of sheet material, the slider comprising front and rear wings and a neck integrally connecting the wings, said neck tapering upwardly acutely to the extreme upper end of the slider and having an opening at a point below the upper end of the slider, and a pull-retaining element having an anchoring portion disposed within said opening.

9. An actuating slider for use with separable fasteners of the class described, said slider having converging guide channels and consisting of sheet material, the slider comprising front and rear wings and a neck integrally connecting the wings, said neck being arched in planes at right angles to each other, the fastener engaging surface of the neck being curved continuously and being smooth and uninterrupted from one margin of the neck to the other margin thereof, the material of the neck being folded to form a depression with the bend of the fold disposed between the wings, the outer surface of the bend of said fold being convex, in a vertical plane parallel to the wings, and constituting a divider for engagement with the fastener elements of the opposed series, the upper portions of the margins of the folded neck material defining the extreme upper ends of the guide channels.

10. An actuating slider for use with separable fasteners of the class described, said slider having converging guide channels and consisting of sheet material, the slider comprising front and rear wings and a neck integrally connecting the wings, said neck consisting of a smoothly curved fold of the sheet material having its bend disposed between the wings and having its lateral marginal portions arranged to form an acute angle, the edges of said marginal portions being substantially in contact, each lateral edge merging smoothly into the upper edge of the front and rear wing.

11. An actuating slider for use with separable fasteners of the class described, said slider having converging guide channels and consisting of sheet material, the slider comprising front and rear wings and a neck integrally connecting the wings, said neck consisting of a smoothly curved fold of the sheet material having its bend disposed between the wings to constitute a divider for the opposed series of fastener elements, the under surface of said bend merging into the front and rear wings and being smooth and integrally continuous from its junction with one wing to its junction with the other wing, the lateral surfaces of the neck being convex toward each other in a substantially horizontal plane, and being curved concavely toward each other in a vertical plane so that their free edges substantially meet at an acute angle and cooperate with the wings to provide flaring mouths for the guide channels.

12. An actuating slider for use with separable fasteners of the class described, said slider having converging guide channels and consisting of sheet material, the slider comprising front and rear wings and a neck integrally connecting the wings, said neck consisting of a fold of the sheet material whose bend is disposed between the wings and forms a divider for the opposed series of fastener elements, the fastener engaging surface of the neck being of a curved contour and continuously smooth and uninterrupted from one margin of the neck to the other margin thereof, the extreme lower end of said fold being arched upwardly in a front to rear plane with the sides of the arch merging smoothly into the inner surfaces of the wings.

13. An actuating slider for use with separable fasteners of the class described, said slider having converging guide channels and consisting of sheet material, the slider comprising front and rear wings and a neck integrally connecting the wings, said neck consisting of a smoothly curved fold of the sheet material having its bend directed downwardly and disposed between the wings, the material forming said bend being integrally continuous from one margin of the neck to the other margin thereof and throughout its entire thickness, the upper edges of the fold meeting to define the extreme upper ends of the channels and to provide a closed socket for a pull-retaining element, the exterior surfaces of the neck being curved and cooperating with the wings to provide guide channels of substantially U-shaped transverse section.

14. An actuating slider for use with separable fasteners of the class described, said slider having converging guide channels and consisting of sheet material, the slider comprising front and rear wings and a neck integrally connecting the wings, said neck consisting of a smoothly curved fold of the sheet material having its bend directed downwardly and disposed between the wings, the lower surface of said bend being continuous and uninterrupted from one margin of the neck to the other margin thereof, the upper edges of the fold meeting to define the extreme upper ends of the channels and to provide a closed socket for a pull-retaining element, the exterior lateral surfaces of the neck being concavely curved and cooperating with the wings to provide guide channels of substantially U-shaped transverse section, the upper ends of the channels being above said socket.

15. An actuating slider for use with separable fasteners of the class described, said slider having converging guide channels and consisting of sheet material, the slider comprising front and rear wings and a neck integrally connecting the wings, said neck consisting of a fold of the sheet material having its bend disposed between the wings to constitute a divider for the opposed series of fastener elements, the fastener engaging surface of the neck being of a curved contour and continuously smooth and uninterrupted from one margin of the neck to the other margin thereof and being devoid of crevices or cracks, the lateral outer surfaces of the said fold being concavely curved and merging smoothly into the inner surfaces of the respective wings.

16. An actuating slider for use with separable fasteners of the class described, said slider having converging guide channels and consisting of sheet material, the slider comprising front and rear wings and a neck integrally connecting the wings, said neck consisting of a smoothly rounded fold of the sheet material having its bend directed downwardly and disposed between the wings to form a divider for the series of fastener elements, the lateral portions of the fold being concavely curved toward each other to provide a socket for the reception of a pull-retaining member, the upper edges of said lateral portions substantially meeting in acute angular relation.

17. A slider of the class described comprising front and rear wings and parts cooperating therewith to define guide channels for opposed series of fastener elements, said channels converging downwardly into a single channel and being separated by a member which increases in width upwardly from the point of convergence of the channels to a point of maximum width located between the wings, said member then tapering acutely upwardly substantially to a point defining the extreme upper end of the slider, the extreme upper end of the slider, the ing at said latter point.

18. A slider of the class described comprising a body portion consisting of a single piece of sheet material shaped to provide front and rear wings, and a tubular neck uniting the wings at one end, said neck tapering both upwardly and downwardly from an intermediate point, the upward taper being acute to provide a substantially sharp edge at the top of the neck, the tubular neck providing a socket opening at its widest part, and a pull-retaining member integrally united at one end to the lower end of one wing, and having its end disposed in said socket.

19. A slider of the class described comprising a body portion consisting of a single piece of sheet material shaped to provide front and rear wings, and a tubular neck uniting the wings at one end, said neck tapering both upwardly and downwardly from an intermediate point, the upward taper being acute so that the neck has a substantially sharp upper edge, the tubular neck providing a socket opening at its widest part, and a pull-retaining member integrally united at one end to the lower end of one wing, the other end of said member passing through said socket and being shaped to prevent its withdrawal therefrom.

20. A slider of the class described comprising a body portion consisting of a single piece of sheet material shaped to provide front and rear wings, and a neck uniting the wings at one end, said neck tapering both upwardly and downwardly from an intermediate point, the upward taper being acute so that the neck comes substantially to a sharp edge at its top, said neck having a socket opening at its widest part, and a pull-retaining member integrally united at one end to the lower end of one wing, the other end of said member being reduced in width to provide a stop shoulder, the narrow part thereof extending through said socket with the stop shoulder engaging the outer face of the front wing and an enlarged head at the end of said narrow portion engaging the outer face of the rear wing, whereby to anchor the pull-retaining member to the neck.

21. A slider of the class described comprising a body portion having front and rear wings and a neck uniting the wings at one end, said neck tapering both upwardly and downwardly in width from an intermediate portion of maximum width located between the wings, the upper part of the neck narrowing substantially to an acute angle, said portion of greatest width having a socket opening therethrough extending from front to rear of the slider, and a pull-retaining member having a part thereof disposed in said socket, said part having an enlargement at the rear of the slider to prevent its withdrawal from the socket.

22. A slider of the class described comprising a body portion having front and rear wings and a tubular neck uniting the wings at one end, said neck tapering both upwardly and downwardly in width from an intermediate portion of maximum width located between the wings, the lateral portions of the neck extending upward at an acute angle and substantially meeting at the top of the neck, said portion of greatest width having a socket opening therethrough extending from front to rear of the slider, a pull-retaining member having a part thereof disposed in said socket and means anchoring said part in the socket, the pull-retaining member having an opening for the reception of a slider actuating pull.

23. The combination with a separable fastener having opposed series of fastener elements mounted respectively upon flexible stringers, each fastener element being rounded at its free end, of an actuating slider consisting of a piece of sheet material bent to provide spaced front and rear wings, and a neck arranged to constitute a divider for the opposed series of fastener elements, the lateral surfaces of the said neck being concave in planes transverse of the slider thereby providing curved surfaces for cooperation with the rounded ends of the fastener units, the fastener engaging surface of the neck presenting a curved surface continuously smooth and uninterrupted from one margin of the neck to the other margin thereof, said surface merging gradually into the inner surfaces of the wings.

24. The combination with a separable fastener having opposed series of fastener elements mounted respectively upon flexible stringers, each fastener element being rounded at its free end, of an actuating slider consisting of a piece of sheet material bent to provide spaced front and rear wings, and a neck arranged to constitute a divider for the opposed series of fastener elements, the fastener engaging surface of the neck presenting a curved surface continuously smooth and uninterrupted from one margin of the neck to the other margin thereof, said neck being curved in a horizontal plane transverse of the slider and also in a vertical plane parallel to the wings of the slider thereby providing smoothly curved surfaces for guiding the rounded ends of the fastener units as they enter and leave the channels.

25. An actuating slider for use with separable fasteners of the class described, said slider having converging guide channels and consisting of sheet material, said slider comprising front and rear wings and a neck integrally connecting the wings, said neck consisting of a fold of the sheet material having its bend directed downwardly and a pull-retaining member having a part disposed within said bend, the marginal portions of the neck being swedged inwardly over said part and tapering to thin edges which substantially meet at the extreme upper end of the slider, said edges terminating the inner walls of the guide channels.

26. An actuating slider for use with separable fasteners of the class described, said slider having converging guide channels and consisting of sheet material, said slider comprising front and rear wings and a smoothly rounded tubular neck integrally connecting the wings, the front wing having an aperture near its lower end, and a pull-retaining member consisting of an elongate strip of material having a toe at its lower end disposed within said aperture, the upper part of said strip having a rearwardly extending portion disposed within the tubular neck of the slider and provided with stops to prevent its withdrawal from said socket.

27. An actuating slider for use with separable fasteners of the class described, said slider having converging guide channels and consisting of sheet material, said slider comprising front and rear wings and a tubular neck integrally connecting the wings, said neck being of curved cross section in planes parallel to and perpendicular to the planes of the wings, respectively, said neck having a socket extending from front to rear therethrough, the front wing having a forwardly projecting lug near its lower end, said lug having an opening therethrough, and a pull-retaining loop having a toe at its lower end seated in the opening in said lug, the upper end of the loop having a rearwardly extending arm disposed in the socket in the neck, said end having stops at the front and rear of the slider body respectively to prevent withdrawal of its arm from the socket.

28. An actuating slider for use with separable fasteners of the class described, said slider having a body made from a sheet metal blank having marginally flanged wing portions united by a neck portion, the latter having substantially parallel edges devoid of projecting tabs, the wing portions being disposed in substantially parallel relation in the completed slider and being of less maximum width and less maximum length than in the blank, the neck material being disposed in a hollow fold, substantially unstretched in its median plane, and with the bend of the fold interposed between the wings and with the edges of the neck material merging smoothly into the upper edges of the wings.

29. An actuating slider for use with separable fasteners of the class described, said slider having converging guide channels and consisting of sheet metal, the slider comprising front and rear wings and a tubular neck integrally uniting the wings, the tubular neck comprising a fold of the sheet metal which is substantially devoid of elongation or stretch in the central plane of the sheet metal which forms the neck.

30. An actuating slider for use with separable fasteners of the class described, said slider having a body consisting of a piece of sheet metal having wing portions united by a neck portion, the latter having substantially parallel edges devoid of laterally projecting flaps, said piece of metal being bent so that its wing portions are disposed in substantially parallel relation, the neck portion, bounded by said parallel edges and the adjacent parts of the wing portions being folded to tubular form.

31. An actuating slider for use with separable fasteners of the class described, said slider having a body consisting of a piece of sheet metal including wing portions united by a neck portion, the latter having exposed substantially parallel lateral edges merging at their opposite ends directly into the material of the respective wing portions, the piece of material being bent to bring the wing portions into substantially parallel relation and the neck material, bounded by said parallel edges and the adjoining portions of the wings, being folded to bring the exposed edges of the neck portion into substantial contact with one another.

32. An actuating slider for use with separable fasteners of the class described, said slider having a body comprising a piece of sheet metal having wing portions united by a neck portion, the latter having substantially parallel lateral edges devoid of projecting tabs, the piece of metal being bent and lateraly compressed so that the wing portions are substantially parallel and of decreased lateral width, the neck material being disposed in a hollow fold depending between the wings and with the edges of the neck material juxtaposed.

33. An actuating slider for use with separable fasteners of the class described, said slider having a body comprising a piece of sheet metal having wing portions united by a neck portion, the latter having substantially parallel exposed lateral edges devoid of laterally projecting tabs, the piece of metal being bent so that its wing portions are substantially parallel, and the neck portion being folded to substantialy tubular form with its lateral edges substantially in contact and with its outer surface smoothly curved from one of said edges to the other.

34. An actuating slider for use with separable fasteners of the class described, said slider having a body made from a sheet metal blank having marginally flanged wing portions united by a neck portion. the wing portions being disposed in substantially parallel relation in the completed slider and being laterally compressed so that the wing portions are of less maximum width than in the blank, the neck material being disposed in a fold having side walls extending downwardly between the wings, the material of said side walls being substantially unstretched at its median plane, said walls having lower portions which are integrally united to constitute a divider for the opposed series of fastener elements.

35. An actuating slider for use with separable fasteners of the class described, said slider consisting of sheet metal and having spaced front and rear wings integrally united by a neck, the slider comprising front and rear wings and a tubular neck integrally uniting the wings, said neck having side walls whose lower portions integrally merge with one another thereby forming a smoothly curved fastener engaging surface, said walls below their extreme upper edges being of a thickness substantially equaling the thickness of the material of the wings.

36. An actuating slider for use with separable fasteners having opposed series of fastener elements mounted respectively upon flexible stringers, said slider having converging guide channels and consisting of sheet metal, the slider comprising front and rear wings and a hollow neck integrally uniting the wings, the neck consisting of a fold of the sheet material having its bend disposed between the wings, said fold being of substantially hyperbolic section in a horizontal plane and constituting a divider for the opposed series of fastener elements, the material of the fold, below its extreme upper edges, being of substantially uniform thickness in transverse section.

37. An actuating slider for use with separable fasteners of the class described, said slider having converging guide channels and consisting of sheet metal, the slider comprising front and rear wings and a tubular neck integrally united at its front and rear portions to the respective wings, the neck having laterally spaced curved walls integrally merging with each other at their lower portions and providing a fastener engaging surface which is smooth and uninterrupted from one lateral margin of the neck to the other, said walls below their extreme upper edges being substantially as thick as the material of the wings.

38. An actuating slider for use with separable fasteners of the class described, said slider comprising a piece of sheet metal having a neck portion integrally uniting wing portions, the piece of metal being bent so that the wing portions are substantially parallel and the neck portion being disposed in a fold with the bend of the fold between the wings, the fold-forming material being substantially unstretched at its median plane, the neck merging by smoothly curved surfaces into the inner surfaces of the respective wings.

39. A slider having a body including front and rear wings and a neck and consisting of a piece of sheet material having wing portions integrally united by a neck portion, said piece of material being bent to bring the wings into substantially parallel relation and the neck portion being disposed in a fold constituting a divider for opposed series of fastener elements, said fold being of substantially U-shape in any section parallel to the wings with its bend disposed between the wings, the fold-forming material being substantially unstretched at its median plane and of substantially uniform thickness except that its extreme lateral margins are thinner than the intervening material.

Signed by me at Berlin, Connecticut, this 8th day of July, 1932.

GEORGE E. PRENTICE.

CERTIFICATE OF CORRECTION.

Patent No. 1,900,949.                                         March 14, 1933.

GEORGE E. PRENTICE.

It is hereby certified that error appears in the printed specification of the above numbered patent requiring correction as follows: Page 10, line 124, claim 17, strike out the words "the extreme upper end of the slider, the" and insert instead "mouths of said channels substantially merg-"; and that the said Letters Patent should be read with this correction therein that the same may conform to the record of the case in the Patent Office.

Signed and sealed this 9th day of May, A. D. 1933.

M. J. Moore (Seal)                                        Acting Commissioner of Patents.